US012163488B1

(12) United States Patent
Sobanski et al.

(10) Patent No.: US 12,163,488 B1
(45) Date of Patent: Dec. 10, 2024

(54) SELECTABLE INLET FOR AIRCRAFT PROPULSION SYSTEM HEAT EXCHANGER

(71) Applicant: RTX Corporation, Farmington, CT (US)

(72) Inventors: Jon E. Sobanski, Glastonbury, CT (US); Neil J. Terwilliger, Cheshire, CT (US); Abbas A. Alahyari, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/243,456

(22) Filed: Sep. 7, 2023

(51) Int. Cl.
*F02K 1/82* (2006.01)
*F02K 1/32* (2006.01)
*F02K 1/38* (2006.01)

(52) U.S. Cl.
CPC ............... *F02K 1/822* (2013.01); *F02K 1/32* (2013.01); *F02K 1/386* (2013.01); *F05D 2220/323* (2013.01); *F05D 2260/213* (2013.01)

(58) Field of Classification Search
CPC ......... F05D 2220/323; F05D 2260/213; F02K 1/386; F02K 1/32; F02K 1/822; B64C 7/02; F01D 25/14; B64D 29/00
See application file for complete search history.

(56) References Cited

U.S. PATENT DOCUMENTS

| | | | |
|---|---|---|---|
| 2,696,712 A | 12/1954 | Gordon | |
| 7,861,512 B2 | 1/2011 | Olver | |
| 9,108,737 B2 | 8/2015 | Zysman | |
| 2017/0009657 A1* | 1/2017 | Schwarz | F02C 7/18 |
| 2017/0044984 A1* | 2/2017 | Pesyna | F02K 3/115 |
| 2021/0115877 A1* | 4/2021 | Boyd | F02C 7/18 |
| 2022/0396367 A1* | 12/2022 | Smith | F02C 7/25 |
| 2023/0332522 A1* | 10/2023 | Klingels | F02C 7/141 |

* cited by examiner

Primary Examiner — Todd E Manahan
Assistant Examiner — Rodolphe Andre Chabreyrie
(74) Attorney, Agent, or Firm — Getz Balich LLC

(57) ABSTRACT

A propulsion system for an aircraft includes a propulsor rotor, an engine core, a housing, a flowpath and a heat exchange system. The engine core is configured to power rotation of the propulsor rotor. The housing includes an inner structure and an outer structure. The outer structure is radially outboard of and axially overlaps the inner structure. The flowpath is downstream of the propulsor rotor and radially between the inner structure and the outer structure. The heat exchange system includes a duct, an exterior orifice, an interior orifice, a flow regulator and a heat exchanger disposed within the duct. The exterior orifice is formed by the outer structure and disposed along an exterior of the housing. The interior orifice is formed by the outer structure and disposed along the flowpath. The flow regulator is configured to selectively fluidly couple the exterior orifice and the interior orifice to the duct.

19 Claims, 9 Drawing Sheets

US 12,163,488 B1

SELECTABLE INLET FOR AIRCRAFT PROPULSION SYSTEM HEAT EXCHANGER

GOVERNMENT LICENSE RIGHTS

This invention was made with Government support under Contract DE-AR0001561 awarded by the United States Department of Energy, Office of ARPA-E. The Government has certain rights in this invention.

BACKGROUND OF THE DISCLOSURE

1. Technical Field

This disclosure relates generally to an aircraft propulsion system and, more particularly, to a heat exchanger for the aircraft propulsion system.

2. Background Information

As government emissions standards tighten, interest in alternative fuels for turbine engines continues to grow. There is interest, for example, in fueling a turbine engine with hydrogen fuel rather than a traditional hydrocarbon fuel such as kerosine to reduce greenhouse emissions. Combustion products produced by combusting hydrogen fuel include water vapor, and exhausted combustion products carry waste heat energy. Various systems and methods are known in the art for recovering the water vapor and/or the heat energy using a heat exchanger. While these known systems and methods have various advantages, there is still room in the art for improvement.

SUMMARY OF THE DISCLOSURE

According to an aspect of the present disclosure, a propulsion system is provided for an aircraft. This propulsion system includes a propulsor rotor, an engine core, a housing, a flowpath and a heat exchange system. The engine core is configured to power rotation of the propulsor rotor about an axis. The housing includes an inner structure and an outer structure. The inner structure houses the engine core. The outer structure houses the propulsor rotor. The outer structure is radially outboard of and axially overlaps the inner structure. The flowpath is downstream of the propulsor rotor and radially between the inner structure and the outer structure. The heat exchange system includes a duct, an exterior orifice, an interior orifice, a flow regulator and a heat exchanger disposed within the duct. The exterior orifice is formed by the outer structure and is disposed along an exterior of the housing. The interior orifice is formed by the outer structure and is disposed along the flowpath. The flow regulator is configured to selectively fluidly couple the exterior orifice and the interior orifice to the duct.

According to another aspect of the present disclosure, another propulsion system is provided for an aircraft. This propulsion system includes a housing, a turbine engine, a flowpath and a heat exchange system. The turbine engine is within the housing. The turbine engine includes a bladed rotor. The flowpath is downstream of the bladed rotor. The heat exchange system includes a duct, an exterior orifice, an interior orifice, a flow regulator and a heat exchanger disposed within the duct. The exterior orifice is formed by and disposed along an exterior of the housing. The interior orifice is formed by the housing and disposed along the flowpath. The flow regulator is configured to: fluidly couple the exterior orifice to the duct during a first mode; and fluidly couple the interior orifice to the duct during a second mode.

According to still another aspect of the present disclosure, a method of operation is provided during which bypass air is directed into a bypass flowpath of a propulsion system of an aircraft. During a first mode of operation, a first portion of the bypass air is directed through the bypass flowpath to an exhaust from the bypass flowpath, and a second portion of the bypass air is directed through an interior orifice to a heat exchanger outside of the flowpath. During a second mode of operation, ambient air is directed from outside of the propulsion system through an exterior orifice to the heat exchanger. The heat exchanger is fluidly decoupled from the exterior orifice during the first mode of operation. The heat exchanger is fluidly decoupled from the interior orifice during the second mode of operation.

The flow regulator may also be configured to fluidly couple the interior orifice to the exterior orifice and at least substantially fluidly decouple the exterior orifice and the interior orifice from the duct in a third mode.

The propulsion system may also include a recovery system and a core flowpath. The recovery system includes the heat exchanger and a separator. The core flowpath may extend through a core of the turbine engine and the heat exchanger from an inlet into the flowpath to an exhaust from the flowpath. The recovery system may be configured to condense water vapor flowing within the core flowpath into liquid water using the heat exchanger. The recovery system may be configured to extract at least some of the liquid water from the core flowpath using the separator.

During a mode of operation, the flow regulator may be configured to: fluidly couple the exterior orifice to the duct; and fluidly decouple the interior orifice from the duct.

During a mode of operation, the flow regulator is configured to: fluidly couple the interior orifice to the duct; and fluidly decouple the exterior orifice from the duct.

The heat exchange system may also include a bypass passage. During the mode of operation, the flow regulator may also be configured to fluidly couple the exterior orifice to the bypass passage.

During a mode of operation, the flow regulator may be configured to fluidly couple the interior orifice and the exterior orifice to the duct.

During a mode of operation, the flow regulator may be configured to: fluidly decouple the interior orifice and the exterior orifice from the duct; and fluidly couple the interior orifice to the exterior orifice.

During a mode of operation, the flow regulator may be configured to direct flow from the flowpath, through the interior orifice, to the exterior orifice to provide reverse thrust.

The duct may be formed by the outer structure and may be radially outboard of the flowpath.

The outer structure may include an exterior surface and a scoop. The scoop may project out from the exterior surface. The exterior orifice may be formed by the scoop.

The exterior orifice may be formed by a ram air scoop at the exterior of the housing.

The outer structure may include an exterior surface and a scoop. The scoop may project into the outer structure from the exterior surface. The exterior orifice may be formed by the scoop.

The exterior orifice may be formed by a NACA duct.

The propulsor rotor may be configured as or otherwise include a fan rotor.

The engine core may include a compressor section, a combustor section and a turbine section.

The propulsion system may also include a recovery system and a core flowpath. The recovery system may include the heat exchanger, a separator and a flow circuit. The core flowpath may extend sequentially through the compressor section, the combustor section, the turbine section and the heat exchanger from an inlet into the flowpath to an exhaust from the flowpath. The recovery system may be configured to condense water vapor flowing within the core flowpath into liquid water using the heat exchanger. The recovery system may be configured to direct the liquid water from the core flowpath into the flow circuit using the separator.

The recovery system may be configured to direct at least some of the liquid water through the flow circuit to engine core.

The recovery system may also include an evaporator through which the core flowpath extends. The recovery system may be configured to evaporate at least some of the liquid water into steam and direct the steam through the flow circuit to the engine core. The heat exchanger may be configured as a condenser.

The propulsor system may also include a fuel system for the engine core. The fuel system may include a fuel source and a fuel injector in the engine core. The fuel system may be configured to direct fuel from the fuel source, through the heat exchanger, to the fuel injector.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
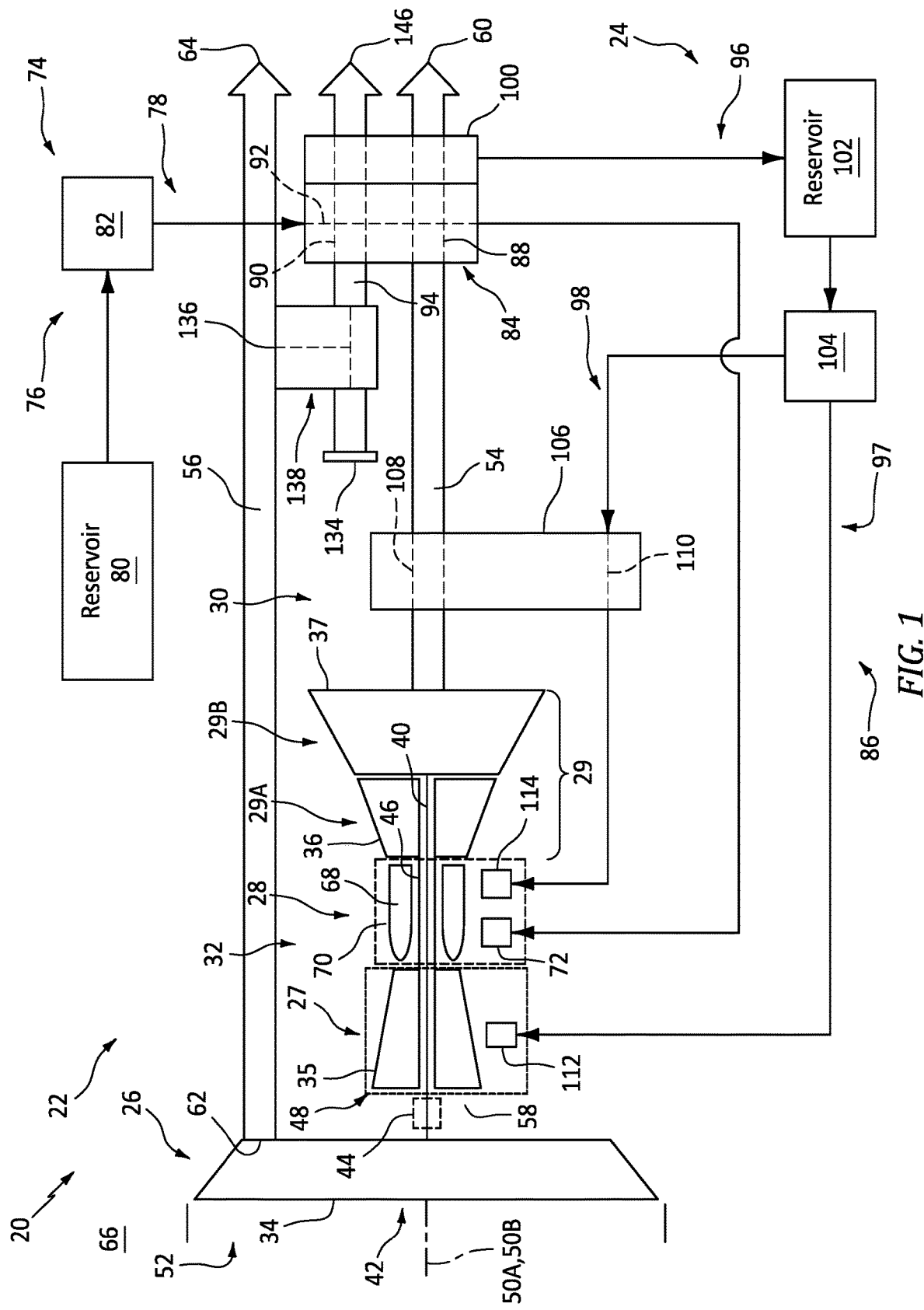
FIG. 1 is a partial schematic illustration of an aircraft propulsion system.

FIG. 1 illustrates a propulsion system 20 for an aircraft. The aircraft may be an airplane, a drone (e.g., an unmanned aerial vehicle (UAV)) or any other manned or unmanned aerial vehicle or system. The aircraft propulsion system 20 of FIG. 1 includes a gas turbine engine 22 and a water and heat energy recovery system 24.

The turbine engine 22 includes a propulsor section 26 (e.g., a fan section), a compressor section 27, a combustor section 28, a turbine section 29 and an exhaust section 30. Briefly, the compressor section 27, the combustor section 28 and the turbine section 29 may form a core 32 of the turbine engine 22, which engine core 32 powers operation of the propulsor section 26. The turbine section 29 of FIG. 1 includes a high pressure turbine (HPT) section 29A and a low pressure turbine (LPT) section 29B, which LPT section 29B is a power turbine (PT) section for the propulsor section 26.

Each engine section 26, 27, 29A and 29B includes a respective bladed rotor 34-37. Each of these engine rotors 34-37 includes a plurality of rotor blades (e.g., airfoils, vanes, etc.) arranged circumferentially around and connected to one or more rotor bases (e.g., disks, hubs, etc.). The rotor blades, for example, may be formed integral with or mechanically fastened, welded, brazed and/or otherwise attached to the respective rotor base(s).

The propulsor rotor 34 (e.g., a fan rotor) of FIG. 1 is connected to and driven by the LPT rotor 37 through a low speed shaft 40. At least (or only) the propulsor rotor 34, the low speed shaft 40 and the LPT rotor 37 may form a low speed rotating assembly 42; e.g., a low speed spool. This low speed rotating assembly 42 may be configured as a direct drive rotating assembly where the propulsor rotor 34 and the LPT rotor 37 rotate at a common speed. The low speed rotating assembly 42, however, may alternatively be configured as a geared rotating assembly with a geartrain 44 (e.g., an epicyclic gearbox) coupled between the propulsor rotor 34 and the LPT rotor 37. With such an arrangement, the propulsor rotor 34 rotates at a different (e.g., slower) speed than the LPT rotor 37. The compressor rotor 35 of FIG. 1 is connected to and driven by the HPT rotor 36 through a high speed shaft 46. At least (or only) the compressor rotor 35, the high speed shaft 46 and the HPT rotor 36 may form a high speed rotating assembly 48; e.g., a high speed spool. Each of the engine rotating assemblies 42, 48 is supported by a plurality of bearings and rotates about a respective rotational axis 50A, 50B (generally referred to as "50"), which rotational axes 50 may be coaxial or offset (e.g., angled and/or spaced) from one another.

During operation of the turbine engine 22 of FIG. 1, air enters the turbine engine 22 through an airflow inlet 52 into the aircraft propulsion system 20. This air is directed through the propulsor section 26 and into a core flowpath 54 (e.g., annular core flowpath) and a bypass flowpath 56 (e.g., annular bypass flowpath). The core flowpath 54 extends sequentially through the compressor section 27, the combustor section 28, the HPT section 29A, the LPT section 29B and the exhaust section 30 from an airflow inlet 58 into the core flowpath 54 to a combustion products exhaust 60 from the core flowpath 54. The air within the core flowpath 54 may be referred to as "core air". The bypass flowpath 56 extends through a bypass duct and bypasses (e.g., is radially outboard of and extends along) the engine core 32, from an airflow inlet 62 into the bypass flowpath 56 to an airflow exhaust 64 from the bypass flowpath 56. The air within the bypass flowpath 56 may be referred to as "bypass air". Briefly, the core inlet 58 and the bypass inlet 62 may each be fluidly coupled with, adjacent and downstream of the propulsor section 26. The core inlet 58 and the bypass inlet 62 may also be axially aligned along the axis 50 (see FIGS. 3 and 4). The airflow inlet 52, the core exhaust 60 and the bypass exhaust 64 may each be fluidly coupled (e.g., independently, directly) with an environment 66 external to the aircraft propulsion system 20; e.g., an external environment outside of the aircraft.

The core air is compressed by the compressor rotor 35 and directed into a combustion chamber 68 (e.g., an annular combustion chamber) of a combustor 70 (e.g., an annular combustor) in the combustor section 28. Fuel is injected into the combustion chamber 68 by one or more fuel injectors 72 (see also FIG. 2) and mixed with the compressed core air to provide a fuel-air mixture. This fuel-air mixture is ignited and combustion products thereof flow through and sequentially cause the HPT rotor 36 and the LPT rotor 37 to rotate. The rotation of the HPT rotor 36 drives rotation of the compressor rotor 35 and, thus, compression of the air received from the core inlet 58. The rotation of the LPT rotor 37 drives rotation of the propulsor rotor 34, which propels the bypass air through and out of the bypass flowpath 56. The propulsion of the bypass air may account for a majority of thrust generated by the aircraft propulsion system 20.

Figure 2:
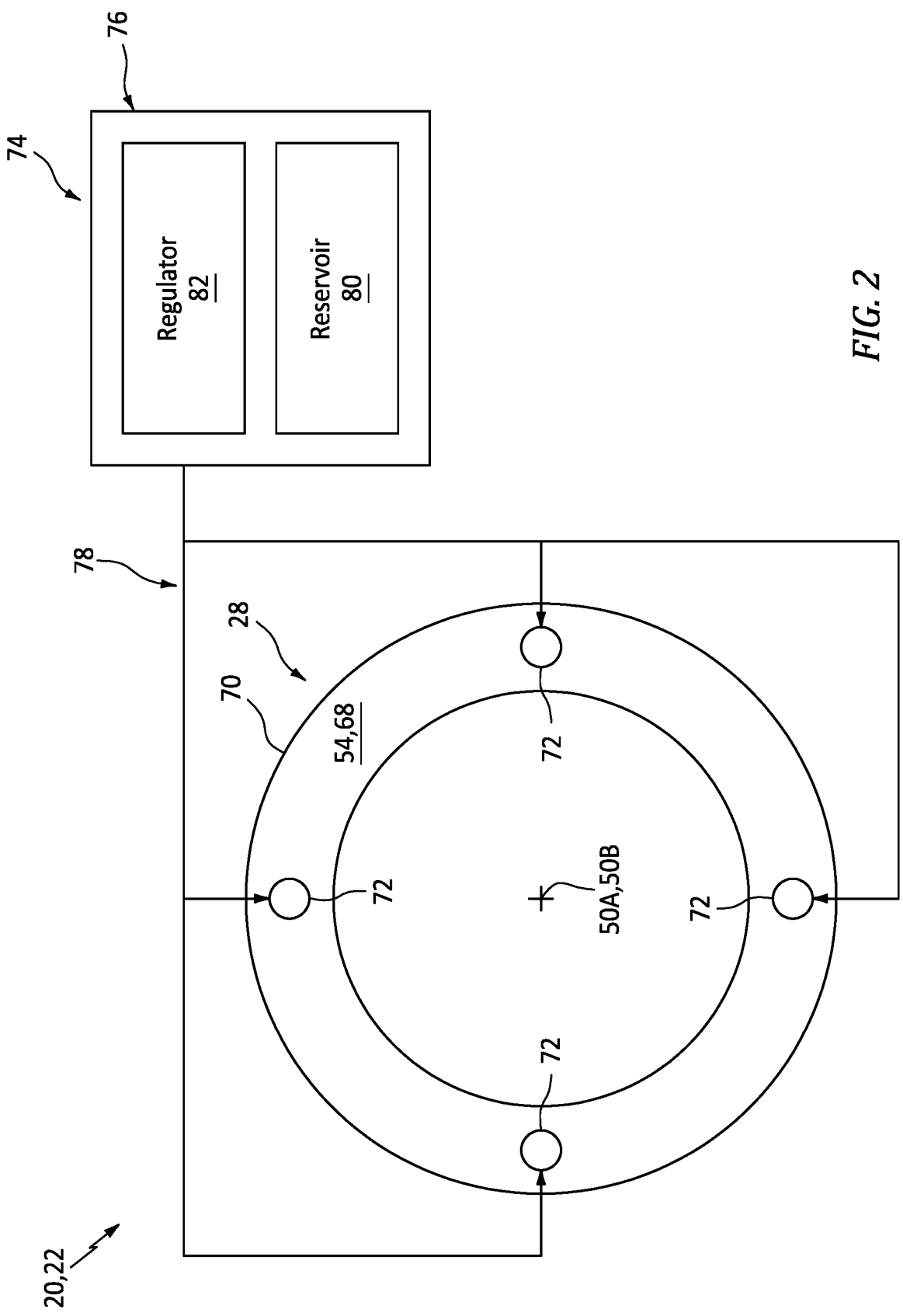
FIG. 2 is a partial schematic illustration of a fuel system for the aircraft propulsion system.

Referring to FIG. 2, the aircraft propulsion system 20 includes a fuel system 74 for delivering the fuel to the combustor section 28 and its combustor 70. This fuel system 74 includes the one or more fuel injectors 72, a fuel source 76 and a fuel circuit 78. The fuel source 76 of FIG. 2 includes a fuel reservoir 80 and/or a fuel flow regulator 82; e.g., a valve and/or a pump. The fuel reservoir 80 is configured to store the fuel before, during and/or after turbine engine operation. The fuel reservoir 80, for example, may be configured as or otherwise include a tank, a cylinder, a pressure vessel, a bladder or any other type of fuel storage container. The fuel flow regulator 82 is configured to direct and/or meter a flow of the fuel from the fuel reservoir 80 to the fuel injectors 72. The fuel injectors 72 may be arranged circumferentially about the axis 50 in an array. Each fuel injector 72 is configured to direct the fuel received from the fuel source 76 into the combustion chamber 68 for mixing with the compressed core air to provide the fuel-air mixture.

The turbine engine 22 of FIG. 1 may be configured as a non-hydrocarbon turbine engine/a hydrocarbon free turbine engine. The turbine engine 22, for example, may be configured as a hydrogen fueled turbine engine. The fuel injected into the combustion chamber 68 by the fuel injectors 72, for example, may be hydrogen ($H_2$) fuel; e.g., $H_2$ gas. The present disclosure, however, is not limited to hydrogen fueled turbine engines nor to non-hydrocarbon turbine engines. The turbine engine 22, for example, may also or alternatively be fueled by another non-hydrocarbon fuel such as, but not limited to, cracked ammonia ($NH_3$). The turbine engine 22 may still also or alternatively be fueled using any other fuel, including hydrocarbon fuels (e.g., kerosene, jet fuel, sustainable aviation fuel (SAF), etc.), which produces combustion products that include water ($H_2O$) vapor.

The recovery system 24 of FIG. 1 is configured to recover at least some of the water produced by the combustion of the fuel-air mixture within the combustion chamber 68 and/or otherwise introduced into the core flowpath 54 (e.g., for intercooling, etc.). The recovery system 24 is also configured to direct at least some of the recovered water back to the turbine engine 22 for use in its engine core 32; e.g., in the compressor section 27 and/or in the combustor section 28. The recovery system 24 of FIG. 1, for example, includes a heat exchanger configured as a condenser 84, and a water flow circuit 86.

The condenser 84 of FIG. 1 includes an internal combustion products passage 88, an internal air passage 90 and an internal fuel passage 92, where each of these condenser passages 88, 90, 92 is fluidly discrete from one another. The combustion products passage 88 forms a portion of the core flowpath 54 which extends longitudinally through the condenser 84. This portion of the core flowpath 54 is arranged between the LPT rotor 37 and the core exhaust 60. The condenser 84 of FIG. 1, for example, is arranged in the exhaust section 30. The air passage 90 forms a portion of a heat exchange flowpath 94 which extends longitudinally through the condenser 84. The fuel passage 92 forms a portion of the fuel circuit 78 longitudinally through the condenser 84. This portion of the fuel circuit 78 may be arranged between the fuel source 76 and one or more or all of the fuel injectors 72.

The condenser 84 of FIG. 1 is schematically shown as a single pass, parallel flow heat exchanger between the combustion products passage 88 and the air passage 90, and the condenser 84 is schematically shown as a single pass, crossflow heat exchanger between the combustion products passage 88 and the fuel passage 92. The condenser 84 of the present disclosure, however, is not limited to such an exemplary arrangement. The condenser 84, for example, may alternatively be configured as a crossflow heat exchanger or a counterflow heat exchanger between the combustion products passage 88 and the air passage 90. The condenser 84 may also or alternatively be configured as a parallel flow heat exchanger or a counterflow heat exchanger between the combustion products passage 88 and the fuel passage 92. Any one or more of the condenser passages 88, 90 and/or 92 may make two or more passes within the condenser 84. Moreover, while the condenser 84 is shown with the three condenser passages, it is contemplated the fuel passage 92 may be omitted in other embodiments and/or incorporated into another condenser arranged along the core flowpath 54.

The flow circuit 86 of FIG. 1 is configured with one or more circuit paths 96-98; e.g., circuit legs. This flow circuit 86 includes a water separator 100, a water reservoir 102, a water flow regulator 104 and another heat exchanger configured as an evaporator 106.

The water separator 100 is arranged with the condenser 84 along the core flowpath 54. The water separator 100, for example, may be configured as or otherwise include a gutter integrated with (e.g., into) the condenser 84, or connected downstream of the condenser 84 along the core flowpath 54. However, various other types of separators are known in the art, and the present disclosure is not limited to any particular ones thereof. The water separator 100, for example, may alternatively be configured as or otherwise include an impingement surface, a centrifugal water separator and/or otherwise.

The water reservoir 102 is configured to store a quantity of water before, during and/or after recovery system operation. The water reservoir 102, for example, may be configured as or otherwise include a tank, a cylinder, a pressure vessel, a bladder or any other type of water storage container. An inlet to the water reservoir 102 is fluidly coupled with an outlet from the water separator 100 along the flow circuit 86 and its source circuit path 96.

The water flow regulator 104 is configured to direct and/or meter a quantity of the water stored within the water reservoir 102 to the liquid water circuit path 97 and/or the gaseous water (e.g., steam) circuit path 98. The water flow regulator 104 of FIG. 1, for example, is arranged at an intersection between an outlet from the source circuit path 96, an inlet to the liquid water circuit path 97 and an inlet to the gaseous water circuit path 98. The water reservoir 102 may thereby be fluidly coupled between the water flow regulator 104 and the water separator 100 along the flow circuit 86 and its source circuit path 96.

The evaporator 106 of FIG. 1 includes an internal combustion products passage 108 and an internal fluid (e.g., liquid water-to-gaseous water) passage 110, where each of these evaporator passages 108 and 110 is fluidly discrete from one another. The combustion products passage 108 forms a portion of the core flowpath 54 which extends longitudinally through the evaporator 106. This portion of the core flowpath 54 is arranged between the LPT rotor 37 and the core exhaust 60. The evaporator 106 of FIG. 1, for example, is arranged in the exhaust section 30. More particularly, the evaporator 106 of FIG. 1 is arranged along the core flowpath 54 between the LPT section 29B and the condenser 84; however, the present disclosure is not limited to such an exemplary arrangement depending on recovery system heating and cooling requirements. The fluid passage 110 forms a portion of the flow circuit 86 and its gaseous water circuit path 98 which extends longitudinally through the evaporator 106. This portion of the flow circuit 86 of FIG. 1 and its gaseous water circuit path 98 is arranged downstream of the water flow regulator 104.

The evaporator 106 of FIG. 1 is schematically shown as a single pass, counterflow heat exchanger between the combustion products passage 108 and the fluid passage 110. The evaporator 106 of the present disclosure, however, is not limited to such an exemplary arrangement. The evaporator 106, for example, may alternatively be configured as a parallel flow heat exchanger or a crossflow heat exchanger between the combustion products passage 108 and the fluid passage 110. Moreover, any one or more of the evaporator passages 108 and/or 110 may make two or more passes within the evaporator 106.

The liquid water circuit path 97 and the gaseous water circuit path 98 are fluidly coupled in parallel with and downstream of the source circuit path 96. The liquid water circuit path 97 of FIG. 1 extends longitudinally out from the intersection/the water flow regulator 104 to one or more liquid water circuit components 112 (one shown in FIG. 1 for ease of illustration) of the turbine engine 22 and its engine core 32. One or more of these liquid water circuit components 112 may each be configured as or otherwise include a liquid water injector. Each liquid water injector may be configured to inject liquid water into the core flowpath 54. One or more of the liquid water circuit components 112 may also or alternatively be configured as an outlet for introducing the liquid water for cooling the core air along the compressor section 27; e.g., intercooling the core air upstream, along and/or downstream of the compressor rotor 35. The present disclosure, however, is not limited to the foregoing exemplary components which utilize the liquid water. In particular, various other uses for liquid water in a turbine engine are known in the art, and the present disclosure is not limited to any particular one thereof.

The gaseous water circuit path 98 of FIG. 1 extends longitudinally out from the intersection/the water flow regulator 104 to one or more gaseous water circuit components 114 (one shown in FIG. 1 for ease of illustration) of the turbine engine 22 and its engine core 32. One or more of these gaseous water circuit components 114 may each be configured as or otherwise include a steam injector. Each steam injector may be configured to inject gaseous water-steam-into the core flowpath 54; e.g., in the combustion chamber 68. One or more of the gaseous water circuit components 114 may also or alternatively be configured as an outlet for introducing the gaseous water for cooling structures and/or fluids along and/or within the combustor section 28 and/or the turbine section 29. The present disclosure, however, is not limited to the foregoing exemplary components which utilize the gaseous water-steam. In particular, various other uses for gaseous water in a turbine engine are known in the art, and the present disclosure is not limited to any particular one thereof.

During operation of the recovery system 24, cooling air may be directed into the condenser 84 and its air passage 90. As described below in further detail, this cooling air may be some of the bypass air bled from the bypass flowpath 56 and/or ambient air (e.g., ram air) from the external environment 66 outside of the aircraft. The fuel may be directed into the condenser 84 and its fuel passage 92. The combustion products, including the water vapor, are directed into the condenser 84 and its combustion products passage 88. The condenser 84 exchanges heat energy between the various working fluids—the cooling air, the fuel and the combustion products—flowing within the condenser 84. During normal turbine engine operation, the combustion products flowing within the combustion products passage 88 are (e.g., significantly) warmer than the cooling air flowing within the air passage 90 and the fuel flowing within the fuel passage 92. The condenser 84 is thereby operable to cool the combustion products using the cooling air and/or the fuel. This cooling of the combustion products may condense at least some of the water vapor (e.g., water in a gaseous phase, gaseous water) flowing within the combustion products passage 88 into liquid water droplets (e.g., water in a liquid phase). A quantity (e.g., at least some or all) of the liquid water may be collected and separated from the remaining gaseous combustion products within the core flowpath 54 by the water separator 100. The water separator 100 may subsequently direct the separated liquid water into the flow circuit 86 and its source circuit path 96 to the water reservoir 102 for (e.g., temporary) storage.

The water flow regulator 104 may selectively direct (e.g., pump, meter, guide, etc.) a quantity of the liquid water from the water reservoir 102 into the liquid water circuit path 97. The liquid water circuit path 97 may direct this quantity of the liquid water to the liquid water circuit components 112 for use with/within the engine core 32 and, for example, its compressor section 27.

The water flow regulator 104 may also or alternatively selectively direct a quantity of the liquid water from the water reservoir 102 into the gaseous water circuit path 98. The gaseous water circuit path 98 may direct this quantity of the liquid water into the fluid passage 110 of the evaporator 106. The combustion products are also directed into the evaporator 106 and its combustion products passage 108. The evaporator 106 exchanges heat energy between the various working fluids—the water and the combustion products—flowing within the evaporator 106. During normal turbine engine operation, the combustion products flowing within the combustion products passage 108 are (e.g., significantly) warmer than the liquid water flowing into and within the fluid passage 110. The evaporator 106 is thereby operable to heat the water using the combustion products. This heating of the liquid water within the evaporator 106 and its fluid passage 110 may evaporate at least some or all of the liquid water flowing within the fluid passage 110 into gaseous water-steam. The gaseous water circuit path 98 may direct a quantity of this gaseous water from the evaporator 106 to the gaseous water circuit components 114 for use with/within the engine core 32 and, for example, its combustor section 28 and/or its turbine section 29.

Figure 3:
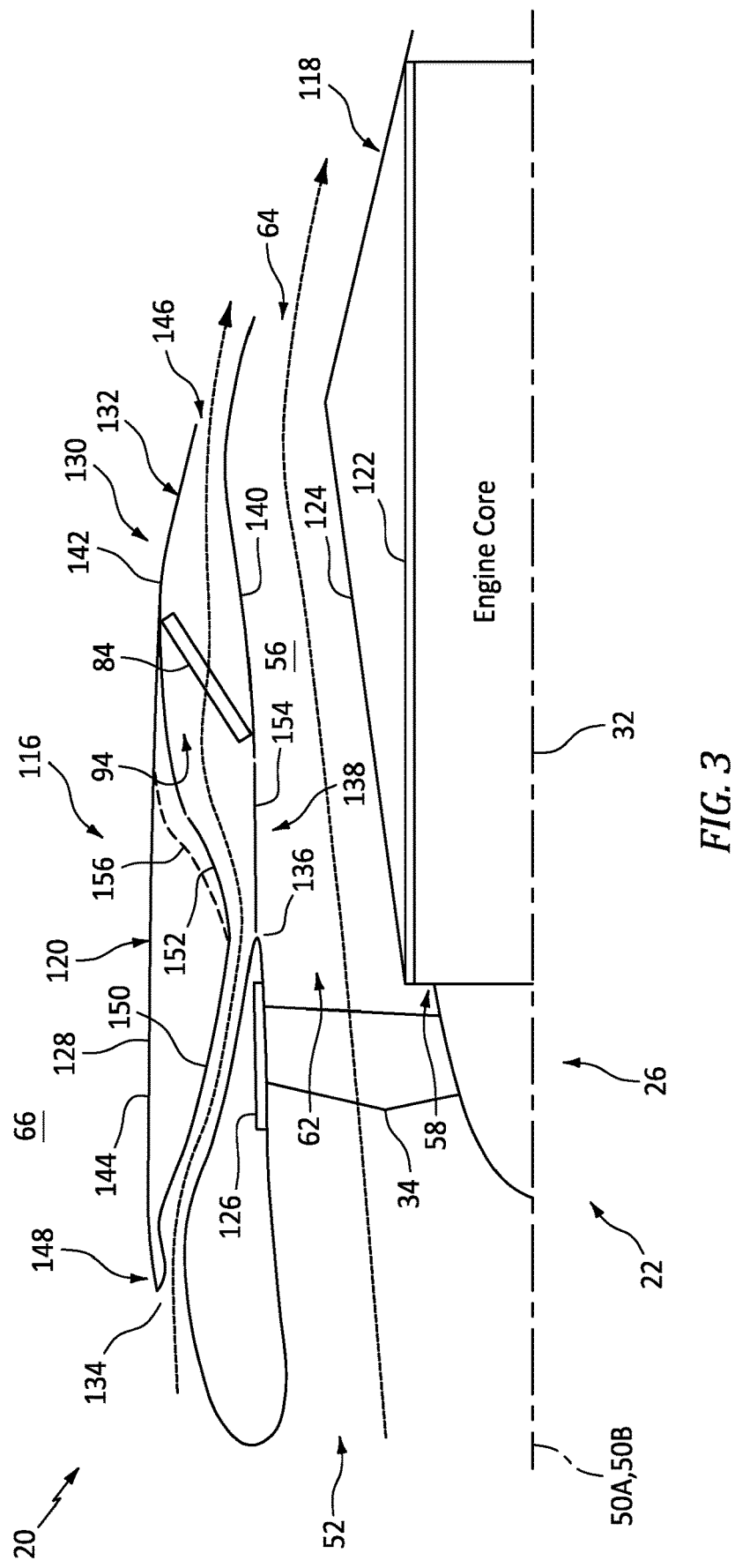
FIGS. 3 and 4 are partial schematic sectional illustrations of the aircraft propulsion system with a heat exchange system in various modes of operation.
Figure 4:
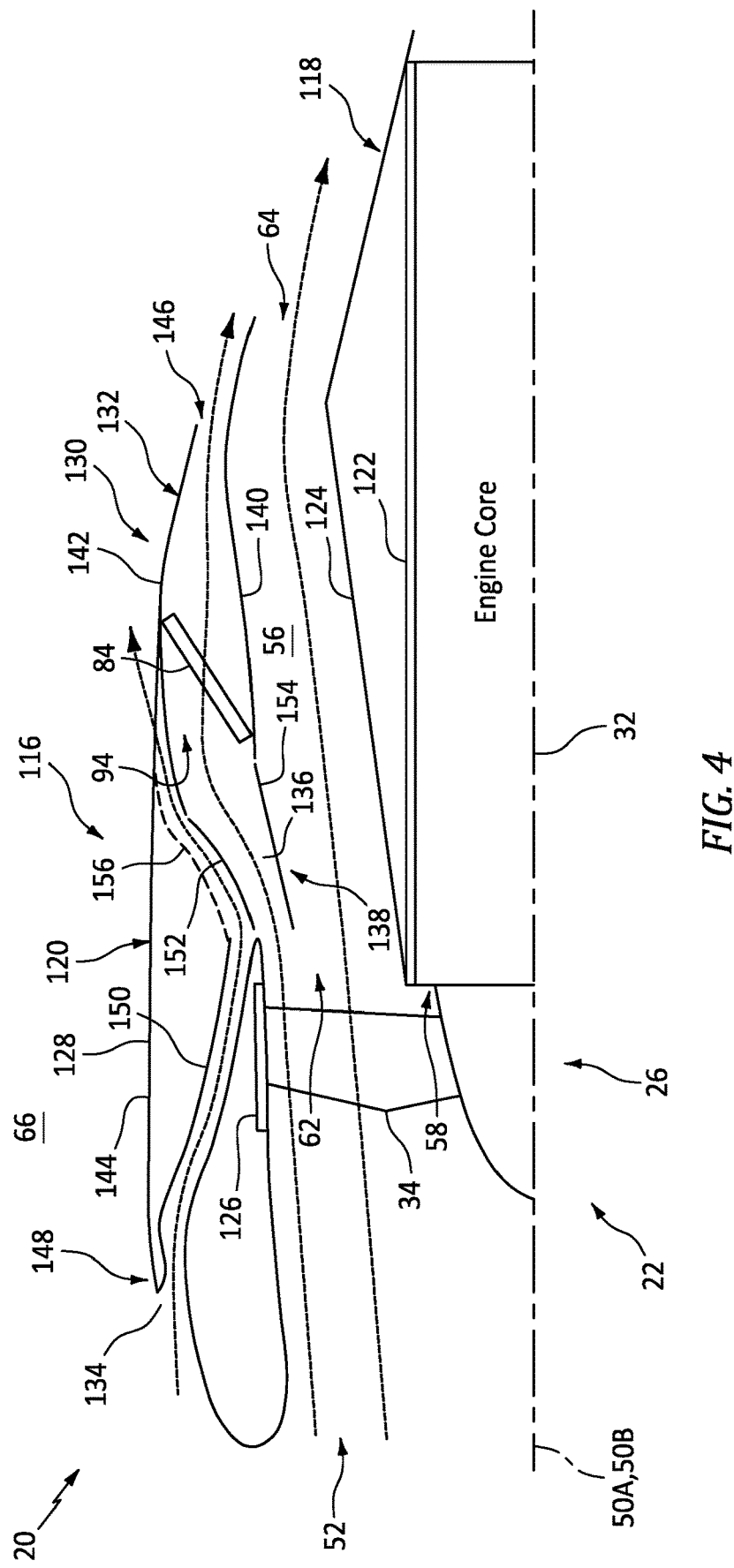

Referring to FIGS. 3 and 4, the aircraft propulsion system 20 includes an engine housing 116 for housing the turbine engine 22 and its propulsor section 26 and its engine core 32. This engine housing 116 includes a housing inner structure 118 and a housing outer structure 120.

The inner structure 118 includes an inner case 122 (schematically shown) and an inner nacelle 124. The inner case 122 houses the engine core 32 and its engine sections 27-29B (see FIG. 1). The inner nacelle 124 houses and provides an aerodynamic cover over at least the inner case 122. The inner nacelle 124 of FIGS. 3 and 4 forms an inner peripheral boundary of the bypass flowpath 56.

The outer structure 120 includes an outer case 126 and an outer nacelle 128. The outer case 126 houses at least the propulsor section 26. The outer nacelle 128 houses and provides an aerodynamic cover over at least the outer case 126. The outer nacelle 128 of FIGS. 3 and 4 is also disposed radially outboard of, extends circumferentially about (e.g., circumscribes) and extends axially along (e.g., overlaps) at least a forward portion of the inner nacelle 124. The outer structure 120 and its members 126 and 128 of FIGS. 3 and 4 form an outer peripheral boundary of the bypass flowpath 56. The inner structure 118 and its inner nacelle 124 and the outer structure 120 and its members 126 and 128 thereby form the bypass flowpath 56 within the engine housing 116. The bypass flowpath 56 extends longitudinally (e.g., generally axially) within the engine housing 116 (e.g., radially between the inner structure 118 and the outer structure 120) from the bypass inlet 62 to the bypass exhaust 64.

The aircraft propulsion system 20 of FIGS. 3 and 4 also includes a heat exchange system 130. This heat exchange system 130 includes a heat exchange duct 132, an exterior orifice 134 (e.g., an exterior inlet and/or outlet), an interior orifice 136 (e.g., an interior inlet) and a cooling air flow regulator 138. The heat exchange system 130 also includes the condenser 84 which is disposed within the heat exchange duct 132. The condenser 84 of FIGS. 3 and 4, for example, extends across the heat exchange flowpath 94 within the heat exchange duct 132.

The heat exchange duct 132 is formed by and internal to the engine housing 116 and its outer structure 120. The heat exchange duct 132 of FIGS. 3 and 4, for example, includes an inner duct wall 140 and an outer duct wall 142. The inner duct wall 140 is radially outboard of and may partially form the outer peripheral boundary of the bypass flowpath 56. The outer duct wall 142 is spaced radially outboard of the inner duct wall 140 and may partially form an exterior of the aircraft propulsion system 20 and its engine housing 116. More particularly, the outer duct wall 142 of FIGS. 3 and 4 forms an aerodynamic exterior surface 144 of the engine housing 116 and its outer structure 120. The heat exchange duct 132 and its duct walls 140 and 142 extend longitudinally (e.g., generally axially along the axis 50) from a forward, upstream end of the heat exchange duct 132 to an exhaust 146 from the heat exchange flowpath 94 at an aft, downstream end of the heat exchange duct 132. This heat exchange duct 132 also extends (e.g., partially or completely) circumferentially about the axis 50 within the outer structure 120.

Figure 5:
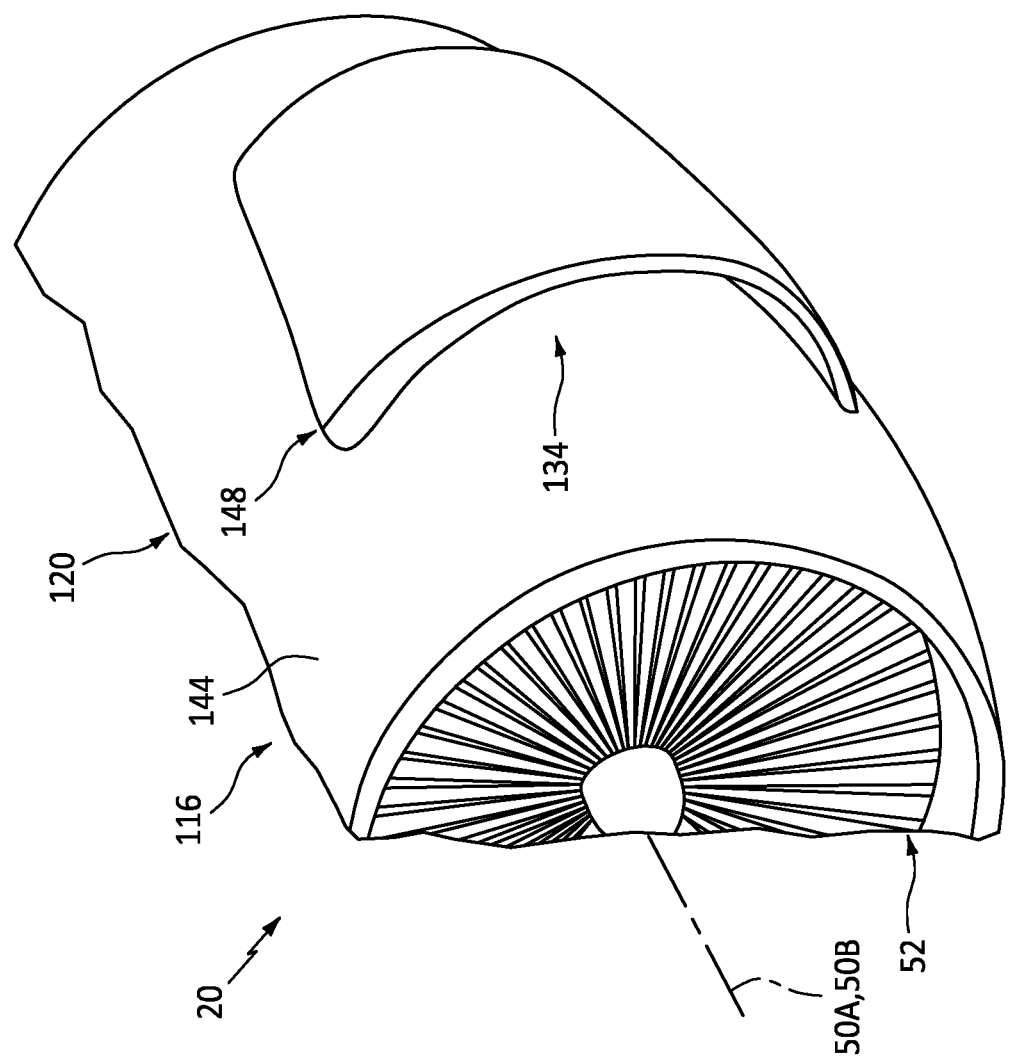
FIG. 5 is a partial perspective illustration of the aircraft propulsion system with a ram air scoop.
Figure 6:
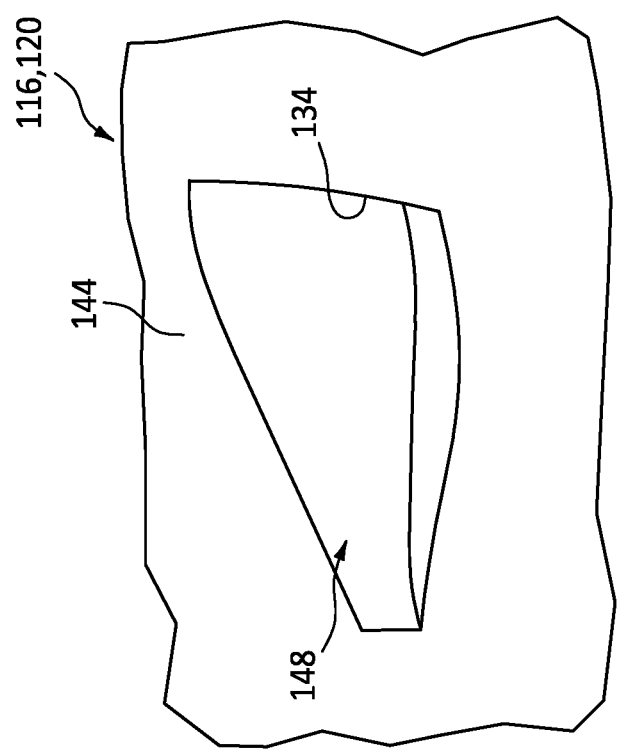
FIG. 6 is a partial perspective illustration of the aircraft propulsion system with a NACA duct scoop.

The exterior orifice 134 is formed by the engine housing 116 and its outer structure 120. The exterior orifice 134 is disposed along the exterior of the engine housing 116 and its outer structure 120. Referring to FIG. 5, the exterior orifice 134 may be formed by a ram air scoop at the exterior of the engine housing 116. The outer structure 120 of FIG. 5, for example, includes a scoop 148 which projects radially out from the housing exterior surface 144. The exterior orifice 134 forms an opening into the scoop 148. The present disclosure, however, is not limited to such an exemplary scoop nor exterior orifice configuration. For example, referring to FIG. 6, the scoop 148 may alternatively project radially into the outer structure 120 from the housing exterior surface 144. The scoop 148 of FIG. 6, for example, is configured as a NACA duct scoop. Referring to FIGS. 3 and 4, the exterior orifice 134 may be fluidly coupled to the flow regulator 138 by an outer duct 150. This outer duct 150 is formed by and internal to the engine housing 116 and its outer structure 120. The outer duct 150 of FIGS. 3 and 4 extends longitudinally from the exterior orifice 134 to the flow regulator 138.

The interior orifice 136 is formed by the engine housing 116 and its outer structure 120. The interior orifice 136 is disposed along the bypass flowpath 56 and its outer peripheral boundary. The interior orifice 136 of FIGS. 3 and 4, for example, is configured as a port through a wall forming the outer peripheral boundary of the bypass flowpath 56; e.g., a wall of the outer structure 120.

The flow regulator 138 is configured to selectively fluidly couple the exterior orifice 134 and/or the interior orifice 136 to the heat exchange duct 132. The flow regulator 138 of FIGS. 3 and 4, for example, includes an outer door 152 (or another valve element) and an inner door 154 (or another valve element). An aft, downstream end of the outer door 152 of may be pivotally connected to the heat exchange duct 132 and its outer duct wall 142. An aft, downstream end of the inner door 154 may be pivotally connected to the heat exchange duct 132 and its inner duct wall 140. Each of these flow regulator doors 152 and 154 may be individually moved (e.g., pivoted) by a discrete actuator (not shown for ease of illustration); however, the movement of the flow regulator doors 152 and 154 may be timed together and/or in sequence. With such an arrangement, the flow regulator 138 may be operated in a ram air mode of operation (see FIG. 3) or a forced induction mode of operation (see FIG. 4).

During the ram air mode of FIG. 3, both of the flow regulator doors 152 and 154 may be moved outwards. The outer door 152, for example, is moved to open a passage between the outer duct 150 and the heat exchange duct 132. The flow regulator 138 may thereby fluidly couple the heat exchange duct 132 with the outer duct 150 and, thus, the exterior orifice 134. The inner door 154 is moved to (e.g., completely) close the interior orifice 136. The flow regulator 138 may thereby fluidly decouple the interior orifice 136 from the heat exchange duct 132. With this arrangement of FIG. 3, the heat exchange flowpath 94 extends from the exterior orifice 134, sequentially through the outer duct 150, the flow regulator 138 and the heat exchange duct 132, to the heat exchange flowpath exhaust 146. The flow regulator 138 may operate in this ram air mode when, for example, the aircraft and its aircraft propulsion system 20 are moving relatively fast relative to the ambient air in the exterior environment 66; e.g., during aircraft cruise.

During the forced induction mode of FIG. 4, both of the flow regulator doors 152 and 154 may be moved inwards. The outer door 152, for example, is moved to (e.g., completely) close the passage between the outer duct 150 and the heat exchange duct 132. The flow regulator 138 may thereby fluidly decouple the heat exchange duct 132 from the outer duct 150 and, thus, the exterior orifice 134. The inner door 154 is moved to open the interior orifice 136. The flow regulator 138 may thereby fluidly couple the interior orifice 136 to the heat exchange duct 132. With this arrangement of FIG. 4, the heat exchange flowpath 94 extends from the interior orifice 136, sequentially through the flow regulator 138 and the heat exchange duct 132, to the heat exchange flowpath exhaust 146. The flow regulator 138 may operate in this forced induction mode when, for example, the aircraft and its aircraft propulsion system 20 are moving relatively slow (e.g., horizontally) relative to the ambient air in the exterior environment 66; e.g., during aircraft taxi, aircraft takeoff or landing, initial aircraft ascent, final aircraft descent, etc.

In some embodiments, the heat exchange system 130 may (or may not) also include a bypass passage 156. This bypass passage 156 may extend from the flow regulator 138 to the exterior of the engine housing 116. During the ram air mode of FIG. 3, the outer door 152 may (e.g., completely) close off an opening to the bypass passage 156. The flow regulator 138 may thereby fluidly decouple the outer duct 150 from the bypass passage 156. However, during the forced induction mode of FIG. 4, the outer door 152 may open the opening to the bypass passage 156. The flow regulator 138 may thereby fluidly couple the outer duct 150 to the bypass passage 156. Provision of this bypass passage 156 may reduce drag and/or back pressure within the outer duct 150 while the outer duct 150 is otherwise closed off by the outer door 152.

Figure 7:
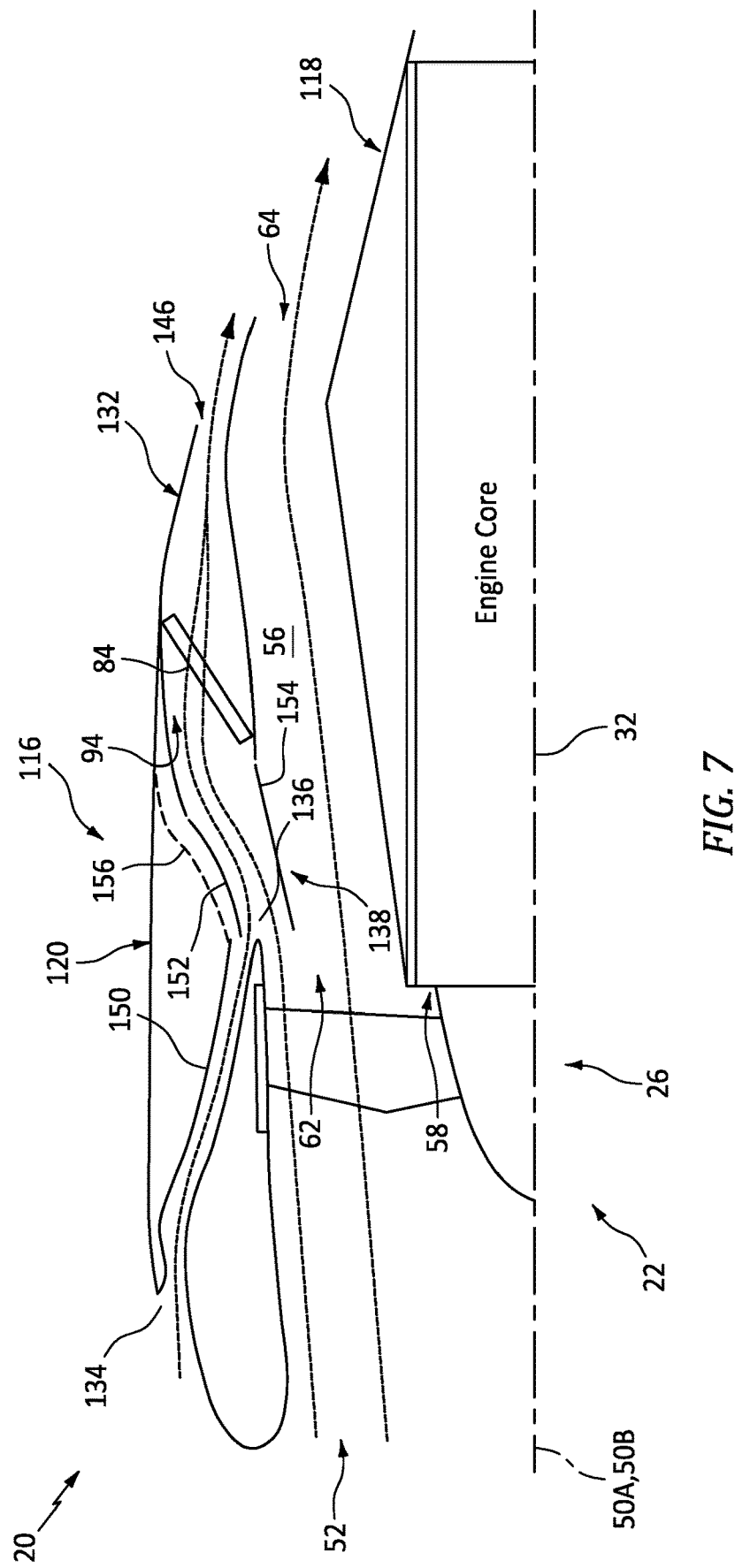
FIGS. 7-9 are partial schematic sectional illustrations of the aircraft propulsion system with the heat exchange system in various other modes of operation.
Figure 8:
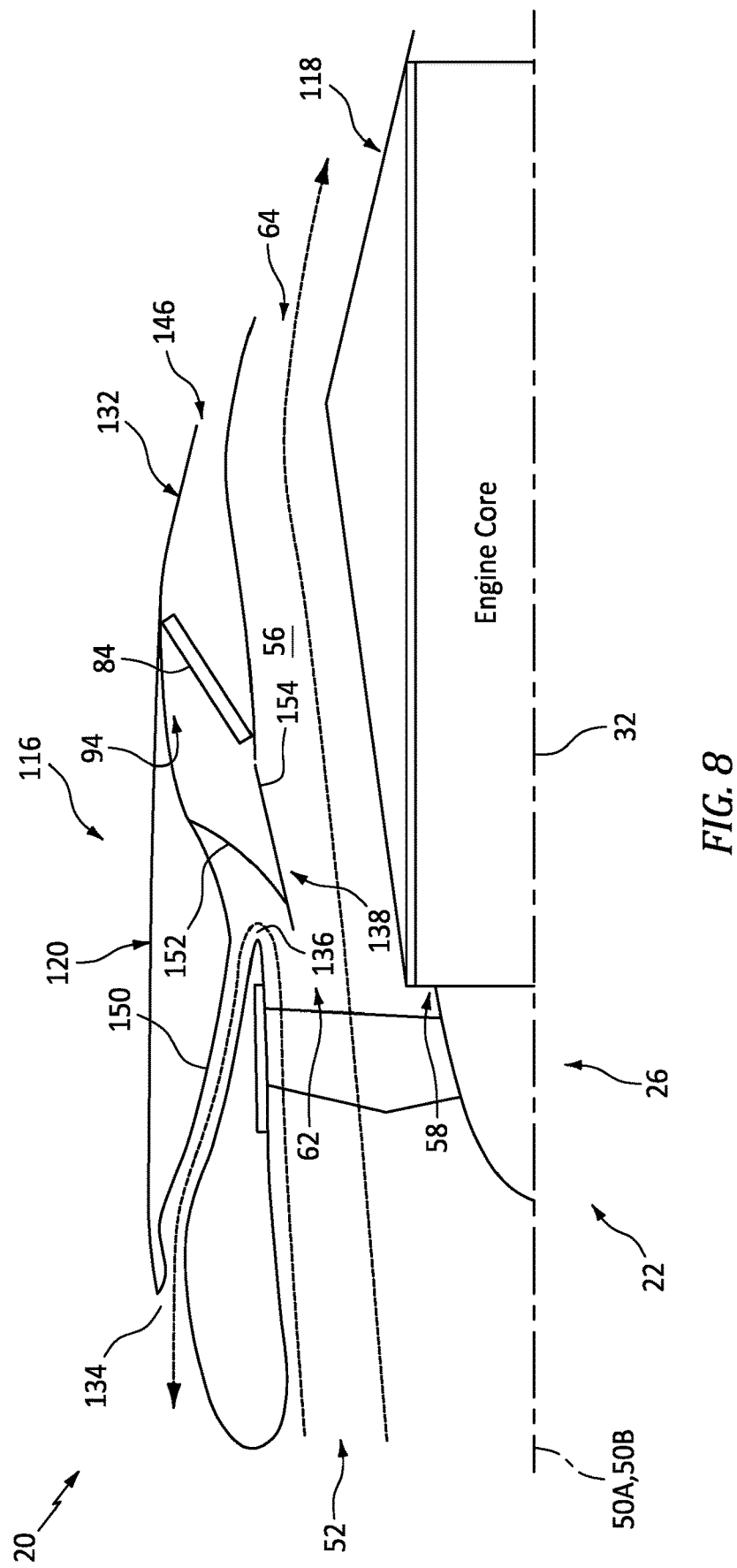
Figure 9:
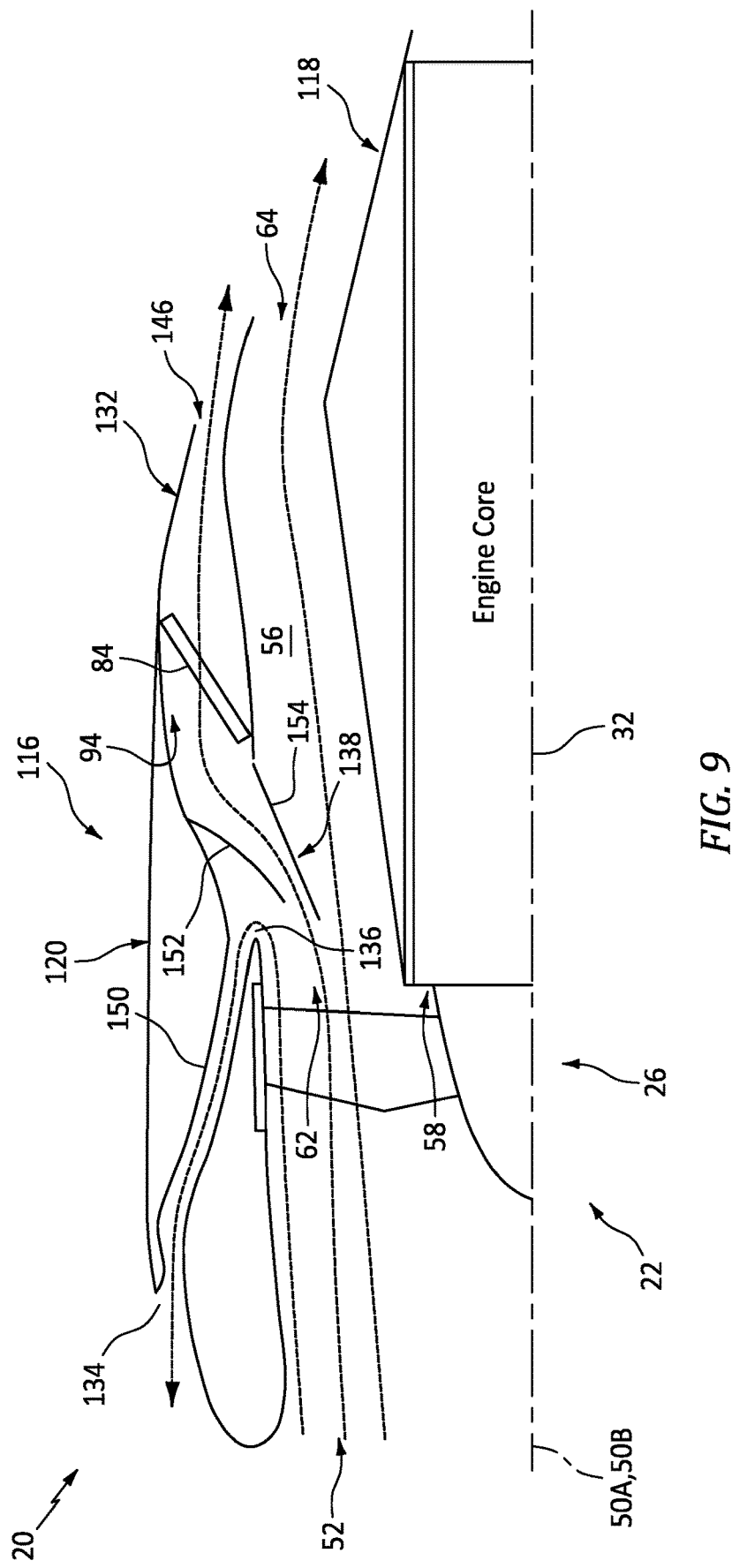

While the operation of the flow regulator 138 is described above with respect to the ram air mode of FIG. 3 and the forced induction mode of FIG. 4, the present disclosure is not limited to such exemplary modes of operation. For example, referring to FIG. 7, the flow regulator 138 may be operated in a transition mode of operation for a period of time. During this transition mode, the outer door 152 and the inner door 154 may be moved to intermediate positioned where the heat exchange duct 132 is fluidly coupled (e.g., in parallel) to both the exterior orifice 134 (e.g., via the outer duct 150) and the interior orifice 136. The heat exchange duct 132 may thereby receive its cooling air from both the bypass flowpath 56 and the exterior environment 66. Moreover, while the above modes of operation facilitate fluid coupling of the exterior orifice 134 and/or the interior orifice 136 to the heat exchange duct 132, the flow regulator 138 may alternatively (e.g., completely) fluidly decouple the exterior orifice 134 and the interior orifice 136 from the heat exchange duct 132. For example, referring to FIG. 8, the flow regulator 138 may be operated in a thrust reverser mode of operation. During this thrust reverser mode, the flow regulator 138 may fluidly couple the interior orifice 136 to the outer duct 150 and, thus, the exterior orifice 134. The outer door 152 may meet (e.g., engage) the inner door 154, and both the outer door 152 and the inner door 154 may project partially into the bypass flowpath 56. The flow regulator 138 may thereby divert at least some of the bypass air out of the bypass flowpath 56, through the interior orifice 136 and the outer duct 150, to the exterior orifice 134 to provide reverse thrust. Here, the interior orifice 136, the flow regulator 138 and the exterior orifice 134 (as well as the outer duct 150 of FIG. 8) may form a thrust reverser for the aircraft propulsion system 20. In other embodiments, referring to FIG. 9, the outer door 152 may be (e.g., slightly) spaced from the inner door 154 to facilitate flow of some bypass air into the heat exchange duct 132. With such an arrangement, the condenser 84 may continue to condense at least some of the water vapor.

For ease of description, the heat exchange system 130 is described above with a single (e.g., arcuate or annular) heat exchange flowpath 94 and a single condenser 84. In other embodiments, however, multiple of the condensers 84 may be arranged with the heat exchange flowpath 94. In still other embodiments, the heat exchange system 130 may include multiple of the heat exchange flowpaths 94 arranged circumferentially about the axis 50, where each heat exchange flowpath 94 is associated with its own condenser (or multiple condensers). The heat exchange flowpaths 92, for example, may be disposed to opposing lateral sides of the aircraft propulsion system 20. Moreover, while the heat exchange system 130 is described above as including the condenser 84 for the recovery system 24, it is contemplated such heat exchange system 130 of the present disclosure may alternatively be configured for other applications. One or more other types of heat exchangers may also or alternatively be disposed within the heat exchange duct 132. Examples of these other heat exchangers include, but are not limited to, a lubricant cooler, an air cooler, and the like.

The heat exchange system 130 may be included with various turbine engines other than the one described above. The heat exchange system 130, for example, may be included in a geared turbine engine where a geartrain connects one or more shafts to one or more rotors. Alternatively, the heat exchange system 130 may be included in a turbine engine configured without a geartrain. The heat exchange system 130 may be included in a geared or non-geared turbine engine configured with a single spool, with two spools, or with more than two spools. Moreover, while the propulsor rotor 34 is described above as a ducted fan rotor, it is contemplated the propulsor rotor 34 may alternatively be configured as another type of bladed rotor; e.g., a compressor rotor, etc. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A propulsion system for an aircraft, comprising:
   a propulsor rotor;
   an engine core configured to power rotation of the propulsor rotor about an axis;
   a housing including an inner structure and an outer structure, the inner structure housing the engine core, the outer structure housing the propulsor rotor, and the outer structure radially outboard of and axially overlapping the inner structure;
   a flowpath downstream of the propulsor rotor and radially between the inner structure and the outer structure; and
   a heat exchange system including a duct, an exterior orifice, an interior orifice, a flow regulator and a heat exchanger disposed within the duct, the duct extending longitudinally from a forward end of the duct to an exhaust at an aft end of the duct, the exterior orifice formed by the outer structure and disposed along an exterior of the housing, the interior orifice formed by the outer structure and disposed along the flowpath, and the flow regulator configured to selectively fluidly couple the exterior orifice and the interior orifice to the exhaust through the duct.

2. The propulsion system of claim 1, wherein, during a mode of operation, the flow regulator is configured to
   fluidly couple the exterior orifice to the duct; and
   fluidly decouple the interior orifice from the duct.

3. The propulsion system of claim 1, wherein, during a mode of operation, the flow regulator is configured to
   fluidly couple the interior orifice to the duct; and
   fluidly decouple the exterior orifice from the duct.

4. The propulsion system of claim 1, wherein
the heat exchange system further includes a bypass passage; and
during a mode of operation, the flow regulator is further configured to fluidly couple the exterior orifice to the bypass passage.

5. The propulsion system of claim 1, wherein, during a mode of operation, the flow regulator is configured to fluidly couple the interior orifice and the exterior orifice to the duct.

6. The propulsion system of claim 1, wherein, during a mode of operation, the flow regulator is configured to direct flow from the flowpath, through the interior orifice, to the exterior orifice to provide reverse thrust.

7. The propulsion system of claim 1, wherein the duct is formed by the outer structure and radially outboard of the flowpath.

8. The propulsion system of claim 1, wherein
the outer structure includes an exterior surface and a scoop;
the scoop projects out from the exterior surface; and
the exterior orifice is formed by the scoop.

9. The propulsion system of claim 1, wherein
the outer structure includes an exterior surface and a scoop;
the scoop projects into the outer structure from the exterior surface; and
the exterior orifice is formed by the scoop.

10. The propulsion system of claim 1, wherein the propulsor rotor comprises a fan rotor.

11. The propulsion system of claim 1, wherein the engine core comprises a compressor section, a combustor section and a turbine section.

12. The propulsion system of claim 11, further comprising:
a recovery system comprising the heat exchanger, a separator and a flow circuit; and
a core flowpath extending sequentially through the compressor section, the combustor section, the turbine section and the heat exchanger from an inlet into the flowpath to an exhaust from the flowpath;
the recovery system configured to condense water vapor flowing within the core flowpath into liquid water using the heat exchanger, and the recovery system configured to direct the liquid water from the core flowpath into the flow circuit using the separator.

13. The propulsion system of claim 12, wherein the recovery system is configured to direct at least some of the liquid water through the flow circuit to engine core.

14. The propulsion system of claim 12, wherein
the recovery system further includes an evaporator through which the core flowpath extends; and
the recovery system is configured to evaporate at least some of the liquid water into steam and direct the steam through the flow circuit to the engine core.

15. The propulsion system of claim 1, further comprising:
a fuel system for the engine core;
the fuel system including a fuel source and a fuel injector in the engine core; and
the fuel system configured to direct fuel from the fuel source, through the heat exchanger, to the fuel injector.

16. The propulsion system of claim 1, wherein
the propulsor rotor is rotatable about an axis; and
the interior orifice is located axially between the exterior orifice and the exhaust along the axis.

17. The propulsion system of claim 1, wherein
the propulsor rotor is rotatable about an axis; and
the interior orifice is located axially between the propulsor rotor and the heat exchanger along the axis.

18. A propulsion system for an aircraft, comprising:
a propulsor rotor;
an engine core configured to power rotation of the propulsor rotor about an axis;
a housing including an inner structure and an outer structure, the inner structure housing the engine core, the outer structure housing the propulsor rotor, and the outer structure radially outboard of and axially overlapping the inner structure;
a flowpath downstream of the propulsor rotor and radially between the inner structure and the outer structure; and
a heat exchange system including a duct, an exterior orifice, an interior orifice, a flow regulator and a heat exchanger disposed within the duct, the exterior orifice formed by the outer structure and disposed along an exterior of the housing, the interior orifice formed by the outer structure and disposed along the flowpath, and the flow regulator configured to selectively fluidly couple the exterior orifice and the interior orifice to the duct, wherein, during a mode of operation, the flow regulator is configured to
fluidly decouple the interior orifice and the exterior orifice from the duct; and
fluidly couple the interior orifice to the exterior orifice.

19. A method of operation, comprising:
directing bypass air into a bypass flowpath of a propulsion system of an aircraft;
during a first mode of operation, directing a first portion of the bypass air through the bypass flowpath to an exhaust from the bypass flowpath, and directing a second portion of the bypass air through an interior orifice to a heat exchanger outside of the flowpath; and
during a second mode of operation, directing ambient air from outside of the propulsion system through an exterior orifice to the heat exchanger;
wherein the heat exchanger is fluidly decoupled from the exterior orifice during the first mode of operation, and the heat exchanger is fluidly decoupled from the interior orifice during the second mode of operation.

\* \* \* \* \*